D. H. WINGERD.
COUPLING DEVICE.
APPLICATION FILED MAR. 17, 1915.
1,143,873.
Patented June 22, 1915.
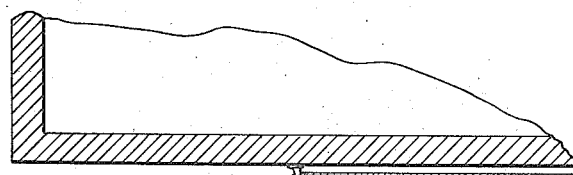
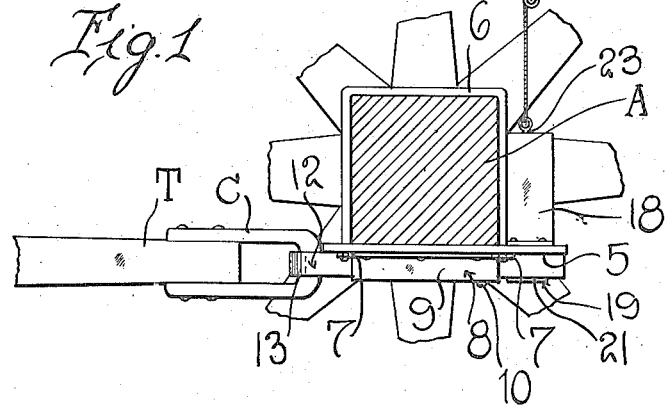
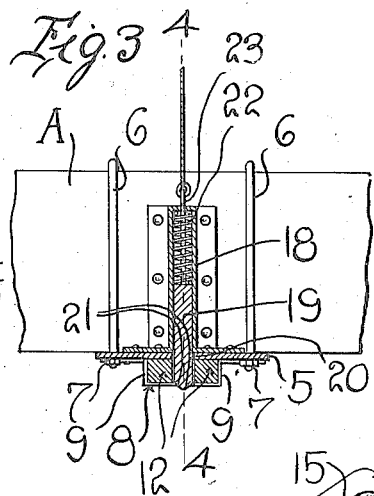
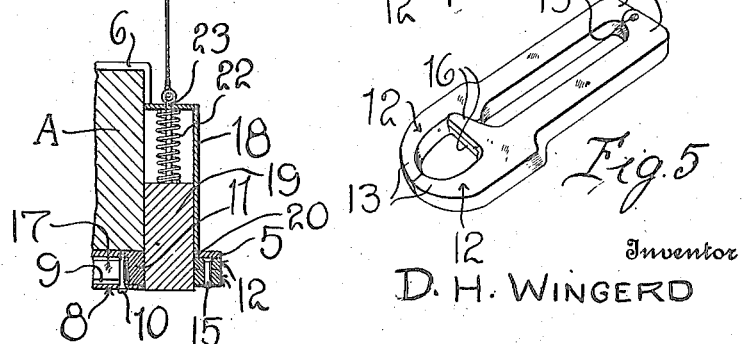
Inventor
D. H. WINGERD
By Watson E. Coleman
Attorney

UNITED STATES PATENT OFFICE.

DAVID H. WINGERD, OF RAMONA, KANSAS.

COUPLING DEVICE.

1,143,873.  Specification of Letters Patent.  Patented June 22, 1915.

Application filed March 17, 1915.  Serial No. 15,035.

*To all whom it may concern:*

Be it known that I, DAVID H. WINGERD, a citizen of the United States, residing at Ramona, in the county of Marion and State of Kansas, have invented certain new and useful Improvements in Coupling Devices, of which the following is a specification, reference being had to the accompanying drawings.

This invention relates to an improved coupling device whereby wagons or other vehicles may be coupled together, and has for its primary object to produce a reliable and effective device of this character mounted upon the vehicle axle to receive and hold the tongue of a second vehicle in connection therewith.

The invention has for another and more specific object to provide a coupling device for the above purpose, including opposed pivotally connected jaws between which the tongue ring or loop is adapted to be engaged, and means for securely locking the jaws in closed position upon said loop.

It is an additional object of my invention to provide a coupling device for vehicles which is strong and durable in its construction, operates automatically to connect or couple vehicles together, and is capable of being easily and quickly actuated to uncouple the vehicle.

With the above and other objects in view, my invention consists in the novel features of construction, combination, and arrangement of parts to be hereinafter more fully described, claimed, and illustrated in the accompanying drawing, in which, Figure 1 is a side elevation showing my improved coupling device arranged upon the rear axle of a vehicle and the tongue of a second vehicle connected thereto; Fig. 2 is a bottom plan view, partly in section; Fig. 3 is a section taken on the line 3—3 of Fig. 2; Fig. 4 is a section taken on the line 4—4 of Fig. 3; and Fig. 5 is a detail perspective view of the pivotally connected coupling jaws.

Referring in detail to the drawing, wherein A designates the rear axle of the vehicle and T the tongue of a second vehicle, 5 indicates the body plate of my improved coupling device which is arranged upon the under side of the vehicle axle and projects laterally beyond the inner face thereof. This plate is centrally secured upon the axle by means of the clip bolts 6 which extend over the axle and have their extremities disposed through the plate and secured thereto by means of suitable nuts 7 which clamp the plate against the under side of the axle. A casing or housing plate 8 is riveted or otherwise secured at its longitudinal edges upon the body plate 5 and has longitudinally converging side walls 9. One end of this housing plate is also centrally secured to the plate 5 by means of a screw or pin 10 and adjacent to this pin, a stop lug 11 is formed upon the body plate 5 within the end of the housing. The housing 8 constitutes a guide for the longitudinally disposed arms of a pair of coupling jaws 12. These jaws are of appreciably greater length than the housing and are provided upon one of their ends with the confronting hooked jaw terminals 13. The other ends of the jaw arms are inwardly extended, as at 14, and connected together by a pivot pin 15, said arms being disposed upon opposite sides of the stop lug 11. At the juncture of each of the curved or hooked jaw terminals with the jaw arms, an inwardly projecting triangular-shape lug 16 is formed thereon. These lugs of the respective jaws are disposed in different horizontal planes so that they will lap upon each other when the jaws are closed, as clearly shown in Fig. 2 of the drawing. The coupling jaws are normally held yieldingly in spaced relation at their free ends by means of a leaf spring 17 which is disposed within the housing 8 and has its medial portion engaged around the pin 10. The extremities of this leaf spring bear against the opposed jaw arms and urge the same apart and into contact with the inclined side walls of the housing plate.

A vertically disposed casing 18 is provided with attaching flanges which are suitably secured to the rear face of the vehicle axle and to the projecting end portion of the plate 5. Within this casing a vertically movable locking key 19 is disposed and the projecting end of the plate 5 is provided with the opening 20 to receive said key. The lower end of the key is provided with oppositely beveled faces, as shown at 21, so that the same will readily pass through said opening and into the space between the inner ends of the jaw arms when the coupling jaws are closed. The key is normally held in this locking position by means of the coil spring 22 which is arranged upon a rod 23 fixed to the upper end of the key and extending through the top wall of the casing 18. A chain or other flexible connection may be attached to this upper end of the rod 23 and extended over suitable pulleys or guides to a position near the driver's seat, where it may be conveniently grasped in order to raise the locking key to its released position.

Upon referring to Fig. 1 of the drawing, it will be observed that the end of the tongue T of the vehicle is provided with the usual clip or loop C, the intermediate portion of which is curved and spaced from the end face of the tongue. In coupling the vehicles together, assuming that the coupling jaws are in their open positions, the tongue clip is engaged between the extremities of the jaws and with the lugs 16 thereon, thereby moving the jaw arms longitudinally and forcing the curved extremities thereof into the tapering housing 8. In this inward movement of the curved ends of the jaw arms, the jaws are forced together against the action of the spring 15 so that the extreme ends of the jaws are engaged with each other, the lugs 16 being disposed in overlapping relation. The tongue iron is disposed in the space between the outer edges of these lugs and the opposed faces of the jaws. When the jaws have thus been forced into the housing 8 to their coupling positions, the spring 22 acts to force the key 19 downwardly through the opening 20 in the plate 5 and into the space between the pivotally connected ends of the jaws which project beyond the end of the housing plate 8. The coupling jaws are thus held against an outward longitudinal movement which would release the tongue clip. When the driver desires to disconnect or uncouple the two vehicles, he simply pulls upon the chain or other flexible connection to the rod 23 and thus lifts the locking key. The tongue of the trailing vehicle will, thereupon, effect a rearward movement of the coupling jaws through the housing 8 so that the jaws are forced apart by the spring 15 and the tongue clip released therefrom.

From the foregoing description, taken in connection with the accompanying drawing, it will be seen that I have produced a simple, effective and reliable coupling device, whereby two vehicles may be easily and quickly coupled together or uncoupled from each other. The device may, of course, be made in various sizes, in accordance with the particular type of vehicle upon which it is to be employed and the loads to be carried thereby.

The device may be readily assembled upon the axle of the ordinary vehicle without necessitating any alterations whatever therein.

The several parts of the coupler may be variously modified in form, proportion, and arrangement, and it will, therefore, be understood that I reserve the privilege of resorting to all such legitimate changes as may be fairly embodied within the spirit and scope of the invention as claimed.

Having thus fully described my invention, what I desire to claim and secure by Letters Patent is:—

1. A coupling device of the character described including a housing, coupling jaws having arms longitudinally movable through the housing and adapted to be projected beyond one end thereof, said jaws being pivotally connected together at one of their ends, each of the jaws being provided with means to be engaged by one of the parts to be coupled whereby the jaws are forced to their closed positions, and a locking key to engage between the opposite ends of the jaws which are projected beyond the housing, whereby the jaws are held against longitudinal movement.

2. A coupling device of the character described including a housing, coupling members arranged in opposed relation and having arms pivotally connected together at one of their ends, curved jaws on the other ends of said arms, a spring within the housing normally urging the jaws apart, each of the jaws being provided with means for engagement by a part to be coupled to project the jaws into said housing and against the side walls thereof, whereby the jaws are forced to their closed position, the other ends of said jaws being projected beyond the end of the housing, and a vertically movable spring pressed locking key adapted to be received between the pivotally connected ends of the arms whereby the coupling members are locked against longitudinal movement.

3. A coupling device of the character described including a housing having longitudinally tapering side walls, opposed coupling members disposed within said housing each having an arm provided with a jaw upon one end projecting from the wider end of the housing, said arms at their opposite ends being pivotally connected together, inwardly projecting overlapping lugs formed on said jaws adapted to be engaged by one of the parts to be coupled whereby the coupling members are forced longitudinally through the housing and the jaws engaged with the tapering side walls and close upon said part, the pivotally connected ends of the arms being projected beyond the opposite end of the housing, and a spring pressed vertically movable locking key adapted for engagement with the latter end of said arms to prevent longitudinal movement of the coupling members.

4. A coupling device of the character described including a body plate, a housing fixed thereon having longitudinally tapering side walls, coupling members arranged within said housing and each including an arm provided with a jaw on one end, the other ends of said arms being pivotally connected together, a spring within the housing normally urging the jaws apart, said jaws having overlapping lugs formed thereon adapted to be engaged by one of the parts to be coupled whereby the jaws are forced into the end of the housing and into engagement with the tapering side walls to close the jaws upon said part, the pivotally connected ends of the coupling members being projected beyond the opposite end of the housing, said plate having an opening therein, a casing mounted upon the plate above said opening, and a spring pressed locking key arranged within said casing and adapted to be projected through the opening in the plate and between the pivotally connected ends of said arms whereby the coupling members are held against longitudinal shifting movement with respect to the housing.

In testimony whereof I hereunto affix my signature in the presence of two witnesses.

DAVID H. WINGERD.

Witnesses:
GEORGE W. KLOVER,
N. M. SONDERGARD.